J. Widmer,
Steam-Engine Valve-Gear.
N°.21,399.          Patented Aug. 31, 1858.

UNITED STATES PATENT OFFICE.

JACOB WIDMER, OF NEW HAVEN, CONNECTICUT, ASSIGNOR TO HIMSELF AND HOWARD GILBERT, OF SAME PLACE.

CUT-OFF FOR STEAM-ENGINES.

Specification of Letters Patent No. 21,399, dated August 31, 1858.

*To all whom it may concern:*

Be it known that I, JACOB WIDMER, of the city and county of New Haven, in the State of Connecticut, have invented a new and useful Improvement in Cut-Offs for Steam-Engines; and I do hereby declare that the following is a full, clear, and exact description of the construction, character, and operation of the same, reference being had to the accompanying drawings, which make a part of this specification, in which—

Figure 1:
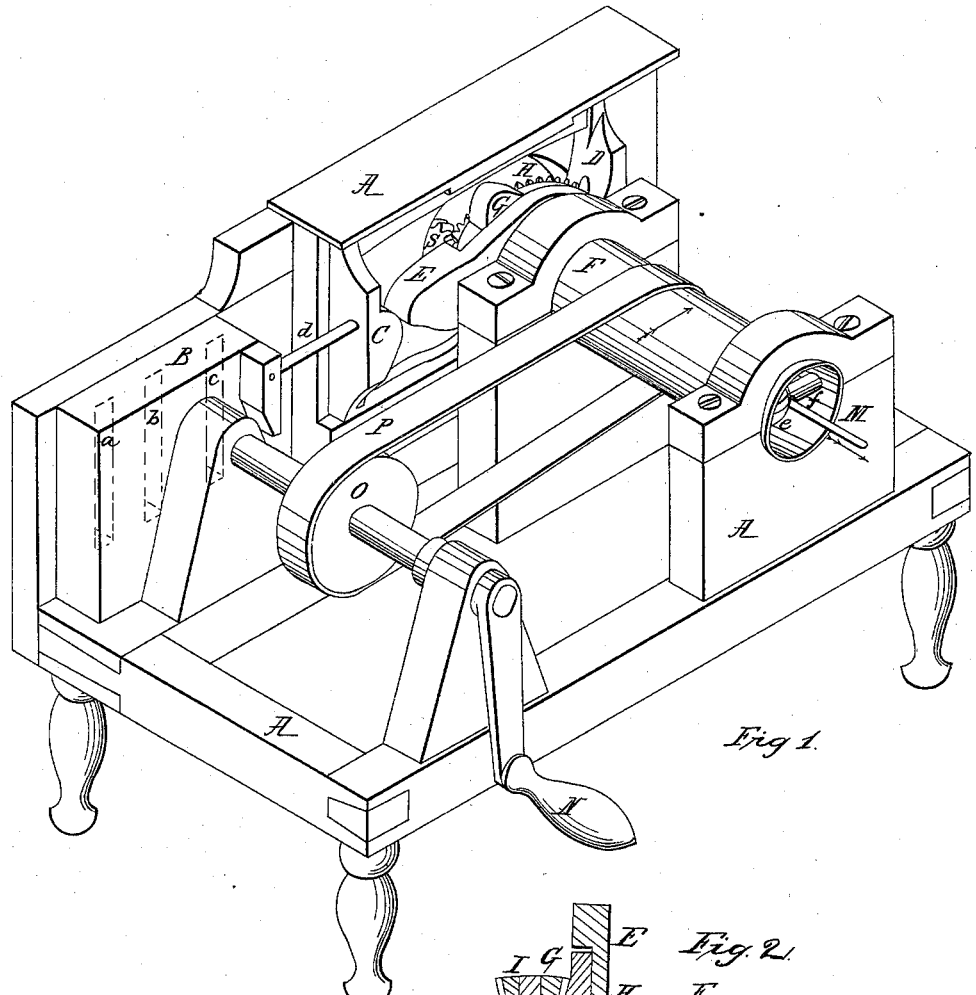
Figure 2:
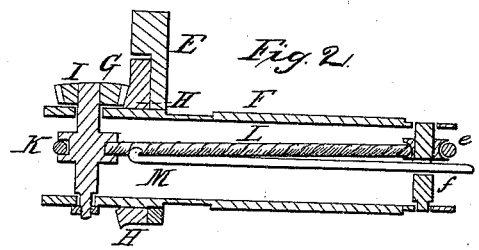

Figure 1 is a perspective view of the whole apparatus, showing the general arrangement of the parts. Fig. 2 is a section of the hollow shaft F, Fig. 1, &c., cut longitudinally through the center, showing its internal structure, cams, gear, &c.

My improvement consists in so constructing and arranging the two cams, one permanently fixed on the hollow shaft, of sufficient extent from the center of the shaft, to open one of the steam ports, (for the induction, and eduction, of the steam,) to its full extent, at each half revolution; and the other cam, so adjustable, by the operation of the governor only, as to cut off the steam at any desired portion of the stroke, so as to preserve a uniform motion of the piston of the engine by the operation of the steam only, without reference to the fire or throttle valves.

I make the frame A, &c., of cast iron, or any other suitable material, substantially in the form represented in Fig. 1.

I make the valve, B, Fig. 1, of any of the usual forms known as the "slide valve," and of any suitable material, having the three steam ports, as usual, as represented by dots at *a*, *b*, and *c*, Fig. 1, and I connect it, by a rod or bar *d*, with the sliding frame, C, D, the end bars of which are made, substantially, in the form shown at C,—(D, being vertically reversed,) for the cams to work against to move the valve.

I make the more prominent cam, E, to move the valve B to open the steam ports *a* and *c* alternately, substantially in the form shown in Fig. 1, and indicated in section, in Fig. 2, and secure it permanently to the hollow shaft F, Figs. 1, and 2, (so that it will constantly revolve with the shaft to open the steam ports *a* and *c*.)

I make the less prominent cam G, Figs. 1 and 2, substantially, in the form shown in Fig. 1, and indicated in Fig. 2, to move back the valve B to cut off the ingress of the steam at the proper portion of the stroke, (according to the power of the steam.) I attach this cut-off cam, G, permanently, to a bevel gear wheel, H, Fig. 1. This wheel, H, revolves freely on the hollow shaft, F, as indicated at H, H, Fig. 2, and works in a bevel gear pinion I, Figs. 1 and 2. On the shaft of this bevel gear pinion I have a fixed pulley, K, around which I pass an endless chain, L, Fig. 2, which chain also passes around a running pulley *e*, Figs. 1 and 2. To this endless chain, L, I attach a rod, M, Figs. 1 and 2, as shown at M, Fig. 2, the outer end of which passes through the shaft on which the pulley, *e*, runs, as shown at *f*, Figs. 1 and 2. The outer end of this rod, as at M, Fig. 1, I connect with the governor by an elbow shaped lever or any other suitable device, in such a manner that the variations of the governor will communicate a longitudinal motion to the rod.

If the rod, M, be drawn out, (in the direction indicated by the dart,) by the increased velocity of the governor, it will, by the operation of the bevel gear pinion, remove the cut-off cam, G, from the main cam, E, and thereby cut off the ingress of the steam at a less portion of the stroke, and vice versa, (as represented in Fig. 1, it would be about two thirds stroke.)

Instead of the endless chain, L, a rack, or band, or any other convenient device, may be used to revolve the bevel gear pinion, I, as convenience may suggest.

The power to revolve the hollow shaft, T, and consequently the cams, may be applied by a crank, as N, with a pulley, as O, and band, as P, or by any other suitable means, in the direction indicated by the dart on the hollow shaft.

I am aware that many regulators and cut offs for the steam engine have been known, and used, some of which have been regulated by the pressure of the steam. I, therefore, do not claim regulating the uniformity of the motion of the piston by the pressure of the steam, as such, as my invention; but,

What I claim as my invention, and desire to secure by Letters Patent, is—

The combination of the bevel gear pinion, (I,) operated by the endless chain, (L,) and rod, (M,) with the bevel gear wheel, (H,) with its cam, (G,) when the whole is constructed, arranged, and made to produce the result; substantially, as herein described.

JACOB WIDMER.

Witnesses:
 HOWARD GILBERT,
 R. FITZGERALD.